Patented Aug. 5, 1952

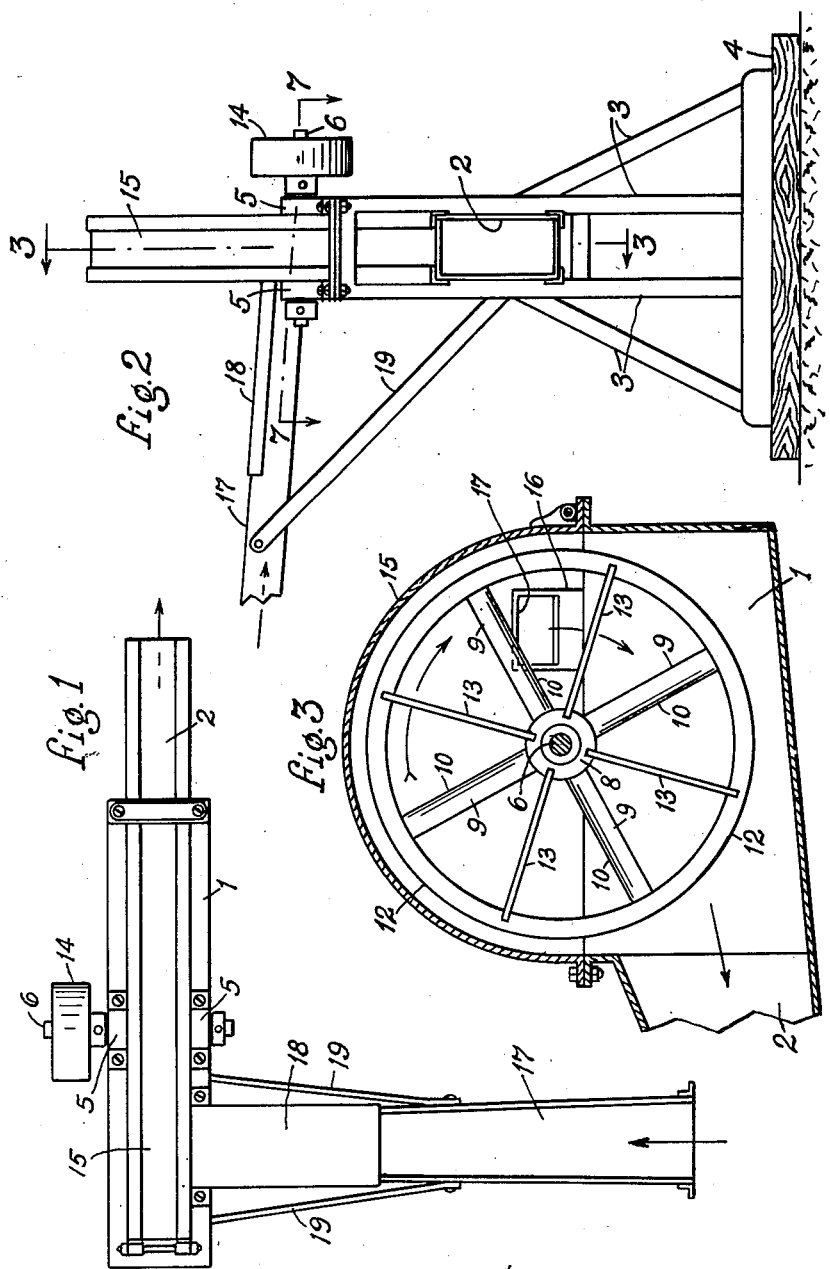

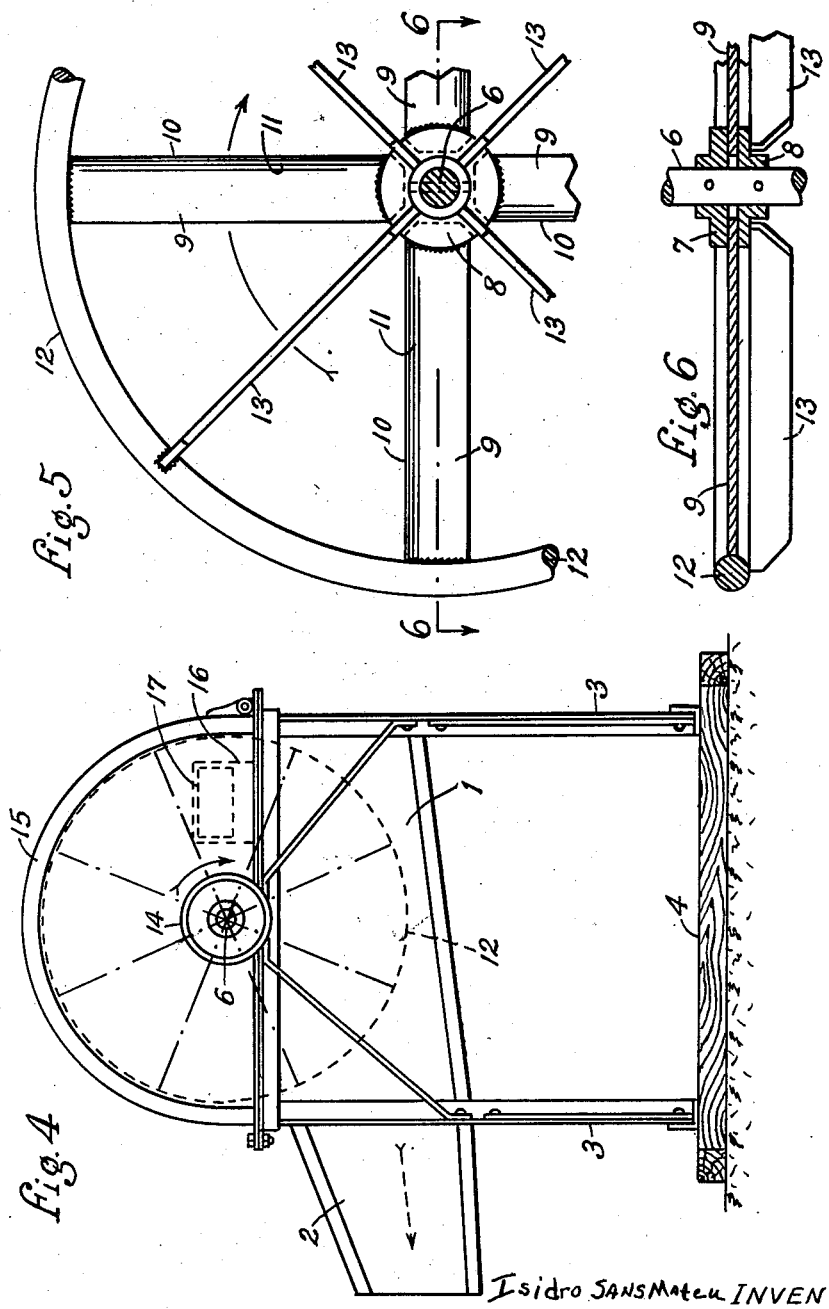

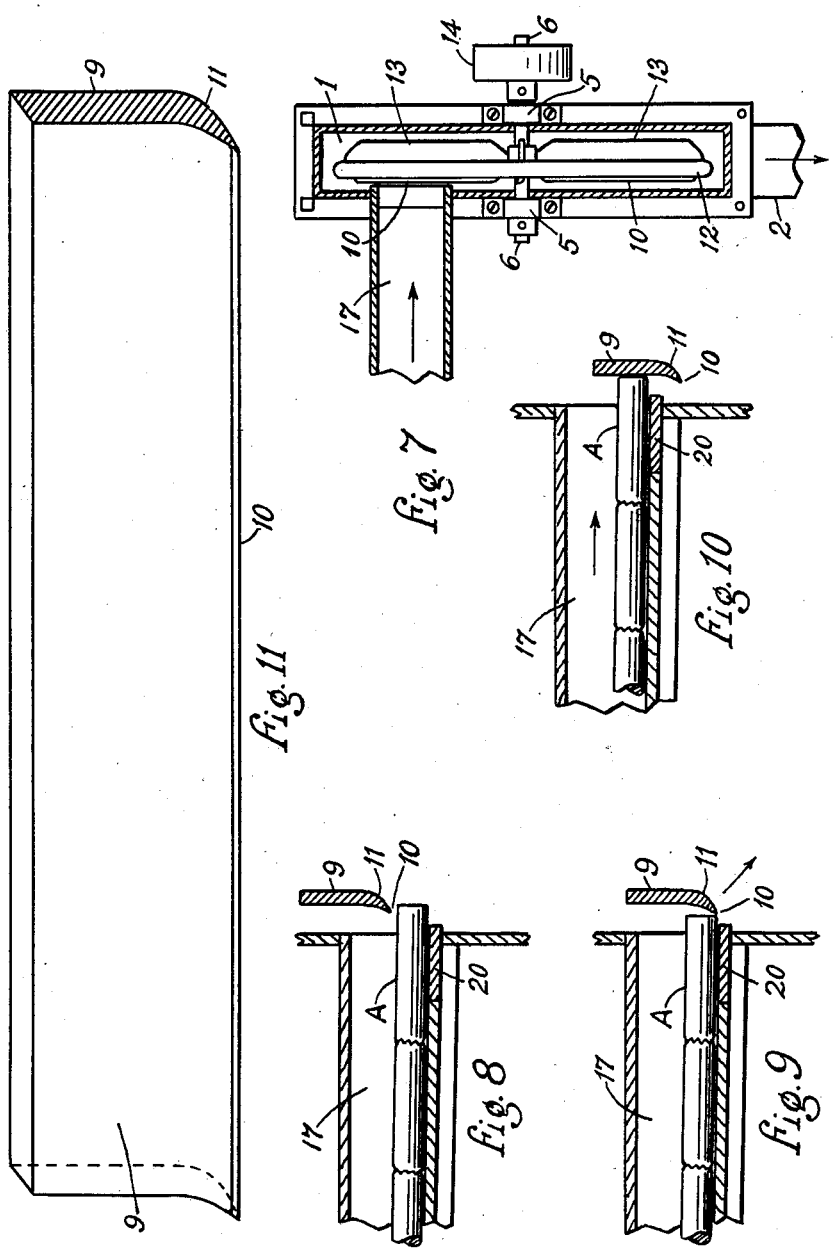

2,605,800

UNITED STATES PATENT OFFICE 2,605,800

MACHINE FOR CUTTING OR CHOPPING FODDER

Isidro Sans Mateu, Cabaiguan, Cuba

Application January 2, 1951, Serial No. 203,813
In Cuba March 2, 1950

1 Claim. (Cl. 146—107)

My invention relates to a machine for cutting or chopping fodder, specially the different classes of plants used in feeding cattle and horses with what are generally called "green foods," such as the leaves and stalks of sugar cane and corn reducing them to small portions that can be mixed with different grains like corn, oats, etc.

Up till now, most of the types of mills and cutting machines employed in cutting or reducing to suitable sizes the stalks and leaves of plants employed as food for cattle and horses have been provided with drums, which function as cutting or triturating means, such machines being objectionable because the product obtained with them is never cut to a uniform size, they are not economical and are not easy to clean. The residual vegetable products remaining in said machines tend to ferment, decompose and, if not thoroughly cleaned, will contaminate the next batch of food that is ground or cut.

An object of the present invention is to provide a fodder cutting machine that is extremely simple and economical, that is easy to maintain in perfect working order and which lacking complicated parts liable to clog or deteriorate is not subject to interruptions.

Another object of the invention is to provide a machine for the above stated purposes that is very efficient and produces a final product in which all the natural juices of the plants employed are preserved, thus producing a more nutritious food than any of the machines of this type heretofore employed.

Still another object of the present invention is to provide a fodder cutting machine which, besides cutting the fodder correctly without extracting any of the natural juices in the plants employed, does its work in such an efficient manner that it is self-feeding and completely eliminates all possibilities of the material being cut clogging the mechanism as so often happens in other machines of this type.

A principal advantage of the machine invented by me is that in it I have eliminated the rolls, drums, conveyors and fans so commonly employed in other machines. In my machine I utilize what can be termed "a fly wheel provided with specially designed cutters or cutting blades" which not only cuts the fodder but is self-feeding, drawing the material to it, and after cutting the fodder expels it, in a positive manner, outwards through a discharge funnel or channel.

As stated before, another advantage of my machine is that since the material is not crushed or compressed at any stage of the operation, all the natural juices of the plants are retained in the final product.

Other objects and advantages of this invention will become apparent to those skilled in the art from the description that follows, which is made in conjunction with the annexed drawings, in which:

Figure 1 is a top view of the machine.

Figure 2 is a lateral elevation of the machine, showing the discharge side.

Figure 3 is a partial vertical section on line 3—3 of Figure 2.

Figure 4 shows the rear elevation of the machine.

Figure 5 is a fragmentary detail view, on a larger scale, showing a rear view of the fly wheel and vanes.

Figure 6 is a sectional detail on line 6—6 of Figure 5.

Figure 7 is a partial horizontal section on line 7—7 of Figure 2.

Figures 8, 9 and 10, drawn to a larger scale, illustrate details of the working positions of the material in the feeding channel in conjunction with the cutting blade.

Figure 11 is a perspective view, on a larger scale, of one of the cutting blades which, when in use, are attached to the fly wheel by welding or any suitable means, as shown in Figures 3, 5, 6 and 7.

The machine consists principally of a housing 1 that communicates with discharge opening 2 and is supported by base 4 and legs 3. To the upper portion of housing 1 are attached bearings 5 that support horizontal shaft 6, to which are firmly attached discs 7 and 8, to the inner sides or faces of which are attached by welding the inner ends of cutters 9 provided with sharpened edges 10 and curved portions 11. The other or outer ends of cutters 9 being attached to the inner periphery of fly wheel 12 to which are welded vanes 13 which act to push the cut material to outlet port 2. One end of said vanes 13 is attached to the outer face of disc 8 and to the corresponding face of fly wheel 12 thus forming a rigid and efficient body as can be seen in the details illustrated in Figures 3, 5 and 6.

The posterior end of shaft 6 has firmly attached to it pulley 14 which acts to transmit to the machine the rotary motion that it receives through a belt from any suitable source of power. In order to protect the upper portion of fly wheel 12 it is covered by dismountable portion 15 of the housing, said portion 15 having on its anterior face an opening 16 establishing communication with the interior of the machine through feeding duct 17 said duct being protected on its upper side by cover 18 supported by braces 19. Acting as a stationary cutter that works in conjunction with cutter 9 is plate 20 located at the bottom of feeding duct 17, spaced at a convenient distance from the sharpened edges of said cutters. The curved portions of said cutters acting to draw the material forward to a suitable position for cutting. Lastly we have that A designates the material to be cut, represented in the drawings as a piece of sugar cane.

Having thus described the nature of my invention I claim:

In a machine for cutting fodder, a device in the form of a flywheel with longitudinally straight radial cutters extending from the hub of the wheel to its rim to act as spokes, said radial cutters being of curved cross section with their concave surfaces facing the side of the wheel housing in which the feed inlet port is located; flat blades extending from the hub to the rim of the wheel alternating with said radial cutters, said blades being offset towards the side of the wheel housing opposite to that in which the feed inlet port is located; said wheel being mounted on a horizontal shaft journaled on bearings located in said wheel housing, a housing enclosing said wheel and furnished with an inlet port on the side of said housing facing the concave surfaces of said radial cutters, said inlet port having at its inner lower edge a flat plate to act as a stationary cutter working in conjunction with said radial cutters on the wheel, a discharge part in said wheel housing located at a suitable point below said wheel shaft, and means for rotating said wheel shaft.

ISIDRO SANS MATEU.

REFERENCES CITED

The following references are of record in the file of this patent:

UNITED STATES PATENTS

| Number | Name | Date |
|---|---|---|
| 608,014 | Thom | July 26, 1898 |
| 1,185,155 | Williams | May 30, 1916 |
| 2,552,933 | Browne | May 15, 1951 |

FOREIGN PATENTS

| Number | Country | Date |
|---|---|---|
| 56,158 | Austria | July 1, 1912 |